3,054,690
PROCESS FOR TREATING NYLON FABRIC

Alfred L. Miller and James A. Rae, Cranford, and Addison W. Hubbard, Westfield, N.J., assignors to Esso Research and Engineering Company, a corporation of Delaware
No Drawing. Filed Dec. 15, 1958, Ser. No. 780,234
4 Claims. (Cl. 117—7)

The present invention concerns an improved process for treating synthetic fiber used in an article containing high molecular weight polymers. More specifically it concerns a process for treating nylon which involves stretching it and coating it with a solution of a high molecular weight polymer.

The process of simultaneous latex application, tension-drying and hot-stretching is widely used in the rubber industry to obtain a nylon tire cord suitable for use in both truck and motor car tires. The latex dip provides a bond for the calendered rubber and the hot-stretching stabilizes the cord fabric insofar as its elongation under load is concerned. Accordingly, this heat treating operation reduces the possibility of carcass growth in the completed tire. The latex dipping and hot-stretching operations are important steps which develop optimum strength in the cord for maximum tire service. In the conventional hot-stretching nylon cord operation, the raw cord is immersed under low tension in a water solution, latex or other adhesive, and after impregnation the free excess moisture is mechanically removed before the fabric is air dried. Simultaneously, the air drying step provides thermal energy sufficient to reorganize the molecular structure of the nylon under controlled tension and elongation conditions to effect the proper hot-stretching of the dipped cord. While the aforementioned process results in a fabric having desirable properties, it has the disadvantage of making the fabric stiff and difficult to work with, especially in building tires. This problem has been found to be especially acute when nylon fabric is so treated with a compounded butyl rubber latex or cement and imbedded in a butyl rubber stock.

It has now been discovered that nylon can be treated with a polymer solution in a manner which will result in a fabric that is supple and with which it is easy to build a tire. Moreover, it has been found that the fabric has better adhesive properties than fabrics obtained by dipping before stretching. This is accomplished by stretching the nylon cord to the desired degree prior to coating it with liquid or polymer-containing liquid. The cord may be stretched by any technique known in the art, such as passing it through a hot air oven maintained at a sufficiently high temperature to permit the nylon to be stretched from about 5 to 15% of its original length without breaking. For instance, the cord may be passed through an air oven which is kept at a temperature of from about 400 to 500° F. at a rate such that every portion of the cord is exposed to the aforementioned heat for at least 5 seconds but not more than 600 seconds. The tension applied to the cord while it is exposed to these higher temperatures may vary from 2 to 6 lbs./cord end, the important thing being that the tension be maintained at a constant level so that all of the cord is uniformly stretched.

Nylon fabric hot stretched 5–15% beyond original length by passing through oven at 400–500° F. with residence time 5–600 seconds while under tension of 2–6 lbs./cord end

---

Hot-stretched cord immersed, under enough tension to maintain constant length, in butyl-type rubber latex-phenol-aldehyde resin adhesive dip at room temperature

---

Latex-dipped cord passed through squeeze roll and then through drying oven at 200–400° F., under enough tension to maintain constant length The term "nylon" as used herein means solid polyamide resins made by polymerizing a polyamine salt of a dibasic acid, e.g. salt composed of hexamethylene diamine and adipic acid.

The hot-stretching operation is essentially a modification of the cord fabric under conditions of constant temperature, exposure time and tension. The fabric tension must be maintained within suitable holdback rolls and forward pull rolls as external tension is applied to the cord by appropriate mechanical means.

The amount of the total heat absorbed by the nylon itself is a critical factor in the hot-stretching operation. The maintenance of proper air temperature and impact velocity on the cord are of primary importance. Electronic instrumentation with a high speed of response is required for accurate temperature control so that varying fabric speeds will not affect the temperature in the heating medium. It has been found that convection air temperature, air-impact velocity, and exposure times must be kept constant, regardless of fabric speed or mass, to insure a uniform application of thermal energy to the material in the hot-stretch operation.

The intrinsic work that must be performed in the hot-stretching of nylon is the product of the mechanical energy applied in the form of tension or stretch during the heat-treatment operation and the thermal energy applied to and absorbed by the nylon itself. Thermal energy softens the cord and thereby increases its ductility. As the ductility increases, an equivalent tension or force will produce higher levels of orientation with resultant improved performance characteristics.

The time of exposure of the nylon to the heating medium is also very critical. Excessive exposure at elevated temperatures can result in sintering and melting of the nylon. The rate of heating and conditions of tensions and exposure time apply to any method of heating that could be used in the hot-stretch operation.

The heating medium can be high-velocity convected air, infrared radiation, or possibly high-frequency or dielectric heating. The total heat must be maintained at a rate proportionate to fabric speed.

If the system is convection-heated, automatic damping and volume control is the most feasible method. In an infrared or a radiant-energy system, the relationship of fabric speed to the total electric heat energy available must be determined and controlled. A radiant-heating system is subject to all the physical laws which affect the use of radiant-energy heating. Color, reflectivity, distance from fabric-radiating source, skin coefficient and element temperature, and heating and cooling rate, all must be determined in terms of total heat in the nylon fabric itself.

Convection hot-stretch systems maintain constant air temperatures and constant impact velocity. Relative to fabric speed, convection systems maintain constant exposure time at conditions of constant heat transfer to the nylon cord fabric.

In any hot-stretch system, constant time of heat exposure also requires the operation of suitable cooling equipment so the fabric can be cooled quickly in the event of complete fabric stoppage. If this is not done, the fabric remaining in the hot-stretch machine deteriorates very rapidly or melts and its use in tire construction is undesirable. The fabric should be cooled at a rate proportionate to its change in speed to maintain a constant exposure time relative to its decreasing speed. At the critical point of full exposure, it becomes necessary to reduce the temperature in the fabric as quickly as possible to approximately 150° F. The actual cooling of the cord should be accomplished in a matter of seconds, e.g. 1 to 60 seconds, to prevent the nylon cord from deteriorating under excessive heat conditions.

Cooling of the cord fabric can be accomplished by various means. Cold air is the most feasible means of cooling the fabric, although, under some circumstances, water-cooled rolls might be used. It is highly desirable, however, to minimize the number of roll surfaces over which the fabric passes. After hot-stretching, the fabric should be cooled to temperatures approaching 150° F. Cooling to this point seems to terminate the heat-setting.

Along with constant heating time, constant cord tension is of equal importance. It has been found that lessening the tensions in the cord causes a rapid decrease in its tensile strength. It is necessary, therefore, to maintain a constant tension within a given narrow range in order that all portions of the cord will be given the same amount of stretch. The tension externally developed in the cord causes it to elongate. The elongation represents an economic gain as well as an improvement in cord characteristic.

In carrying out one embodiment of the present invention, nylon fabric, such as type T-700 (tradename of E. I. du Pont de Nemours & Co., Inc., for nylon yarn) having a denier of say 840 x 2, is hot-stretched by passing it through an oven at 400 to 500° F. for from about 5 to 200 seconds under preferably about 4 to 5 lbs./cord end of tension. The fabric is stretched from about 5 to 15%, and preferably 6 to 10%, of its unstretched length. It is sometimes desirable to immerse the fabric in a liquid, such as water, prior to subjecting it to the hot-stretch operation.

The hot-stretched fabric is then immersed in a dip containing rubber latex, and a thermosetting water soluble phenol-aldehyde resin at room temperature. The dipped fabric may then be passed through a squeeze roll which may exert up to 50 lbs. pressure on the fabric and thence through an oven maintained at a temperature sufficiently high to dry the fabric, e.g. from 200 to 400° F. The fabric is then taken up on a roll in a manner such that the fabric is maintained at constant tension, e.g. 1 to 3 lbs./cord end, and constant length throughout the whole operation.

The rubber coated nylon fabric obtained by the above described process has improved adhesion properties and more suppleness than fabrics gotten by the simultaneous dipping and hot-stretching operation. This improvement has been particularly noted when the dip contains butyl rubber since it produces a fabric with which it is quite difficult to build structures such as tires unless it is soft or supple. The present invention is also applicable to modified butyl rubbers, particularly halogenated butyl rubber, which have unusual physical and chemical properties. While it may be used where nylon is treated with other polymers, e.g. natural rubber, styrene-butadiene rubber, etc., the process has special application to butyl-type rubbers.

Butyl rubber, a term well known in the rubber art, e.g. chapter 24 in "Synthetic Rubber" edited by G. Whitby, is a rubbery copolymer comprising a major proportion of an isoolefin having 4 to 7 carbon atoms and a minor proportion of a multiolefin having 4 to 8 carbon atoms. The most commonly employed isoolefin is isobutylene, although other isoolefins such as 3-methyl-butene-1 and 4-methyl-pentene-1 may be used. Suitable multiolefins, which are generally conjugated diolefins, include isoprene, butadiene-1,3, dimethyl butadiene-1,3, piperylene and the like. Most of the copolymers contain about 85 to 99.5 weight percent isoolefin and 0.5 to 15 weight percent diolefin, which in most instances is isoprene. The polymerization is generally carried out at a low temperature, e.g. between −50 and −165° C., in the presence of a Friedel-Crafts catalyst, such as aluminum trichloride, dissolved in a lower alkyl halide, such as methyl chloride, ethyl chloride, etc. Their preparation is fully described in U.S. Patent 2,356,128. Butyl rubbers have a viscosity average molecular weight between about 200,000 and 1,500,000 or more and a Wijs iodine number between about 1 and 50.

The physical and chemical properties of butyl rubber may be modified by introducing a small quantity of halogen into the polymer. In producing halogenated butyl rubber, unmodified, unvulcanized butyl rubber is carefully halogenated until it contains about at least 0.5 weight percent (preferably at least about 1.0 weight percent), but not more than about "X" weight percent of combined halogen wherein:

$$X = \frac{M_3 L}{(100-L)M_1 + L(M_2 + M_3)} \times 100$$

and $L$ = mole percent of the multiolefin in the polymer
$M_1$ = molecular weight of the isoolefin
$M_2$ = molecular weight of the multiolefin
$M_3$ = atomic weight of the halogen Restated, there should be at least about 0.5 weight percent of combined halogen in the polymer but not more than about one atom of chlorine or 3 atoms of bromine combined in the polymer per molecule of multiolefin present therein; i.e. per double bond in the polymer.

Latices of butyl rubber or halogenated butyl rubber may be prepared by dissolving about 10 to 30 weight percent of the rubber in an organic solution, such as a hydrocarbon having from 5 to 8 carbon atoms, e.g. hexane, benzene, heptane, etc. and emulsifying the rubber solution in an aqueous system containing from about 60 to 900, preferably 100 to 600, parts by weight of water per 100 parts by weight of rubber (phr.) and from about 1 to 10 phr. of a suitable emulsifier. Very stable emulsions may be formed by passing the rubber dispersion through a colloidal mill or sonic mixer one or more times. When the desired degree of dispersion has been obtained, at least a portion or all of the organic solvent is stripped from the rubber dispersion by distillation, preferably under partial vacuum. Where highly concentrated latices are desired, the hydrocarbon stripped latex may subsequently be partially stripped of water by further distillation or concentrated by creaming it according to well known techniques.

The emulsifiers may be nonionic, anionic or cationic. Nonionic emulsifiers found useful in some combinations are the polyoxyalkenated alkyl phenols or alcohols having the formula

where R is an alkyl, aryl or alkaryl group, $R_1$ is an alkyl group or hydrogen and $n$ is an integer of 4 to 8 to 10 or even higher. The alkene oxide units should represent at least 40% of the total molecular weight of the compound. These compounds are prepared by condensing an alkyl phenol or an alcohol with ethylene oxide or propylene oxide. Commercial compounds which have been found useful in connection with the present invention include certain of the polyoxyethylated alkyl phenols, such as polypropylated glycols.

Anionic emulsifiers useful in certain combinations include sodium lauryl sulfate, the sodium salt of the sulfates of the polyoxyethylated alkyl phenols, and sodium oleyl taurate which is prepared by condensing abietic acid or tall oil acid with sodium methyl taurine.

Cationic emulsifiers useful in preparing a chlorinated butyl rubber latex include the alkyl dimethyl benzyl ammonium chlorides, diisobutyl phenoxy-ethoxyethyl dimethyl benzyl ammonium chloride and dimethyl phenoxy-ethoxyethyl dimethyl ammonium chloride.

A particularly suitable emulsifier is a salt of sulfated tridecoxypolyethoxyethanol or sulfated nonly phenoxy-polyethoxyethanol in combination with sodium dihydrogen orthophosphate. Generally about 5 phr. of emulsifier and 1 phr. of orthophosphate are employed. In some cases it is desirable to use a small amount of a polyoxyethylated octyl phenol, sold under the trade name Triton X-100, in addition to the above.

The dihydrogen orthophosphate may have an alkali metal, amine or ammonium salt and is generally employed in concentrations between about 0.25 and 2 phr., and preferably between 0.75 and 1.5 phr.

As mentioned above, the latices may contain from about 0.1 to 1 mole of a phenol-aldehyde resin per 100 parts by weight of rubber in the latex. Resins which are within the purview of the present invention may be generally defined as belonging to the class of heat-hardening phenol-aldehyde type resins, preferably resins from phenolic compounds which, prior to heat-hardening or thermosetting are water soluble at least to the extent of 5 to 10% or more. Such resins are capable of thermally setting in the absence of any added catalysts at temperatures of about 150° to 400° F., temperatures of 200° to 300° F. being preferred for coating rayon whereas higher temperatures are permissible for nylon.

As phenolic compounds capable of producing resins of the above-menitoned characteristics, mono- or especially dihydroxy benzenes are satisfactory. Dihydroxy benzenes having the hydroxyl groups meta with respect to each other are preferred. Satisfactory phenolic compounds include phenol, cresols, phloroglucinol, xylenols, trimethylphenols, mono- or dichlorophenols, diamyl or diisopropylphenols, p-tertiary butylphenol, p-phenylphenol, hydroquinone, and especially resorcinol and its derivatives, such as orcinol.

The preferred aldehydes for reaction with the above phenolic compounds are formaldehyde or materials supplying formaldehyde such as paraformaldehyde. Other suitable aldehydes include acetaldehyde, furfural, etc. The ratio of the phenolic compound to the aldehyde is preferably such that the resin, prior to thermosetting, has substantial water solubility as well as solubility in polar solvents. In order to produce the desired resin, a small amount of an alkali metal containing catalyst or other condensing agent is preferred. If sodium hydroxide is employed, it is advantageously present in amounts of about 0.02 to 0.5 percent by weight, based on reactants.

Since the presence of alkalies such as sodium and potassium hydroxide catalyzes the polymerization or condensation of the phenol and the aldehyde to form the resin, these may be present in the dispersion together with the synthetic latex, the phenolic and the aldehyde. A solution of resorcinol, formaldehyde and caustic may be aged for about 6 hours prior to mixing with latex. Or as hereinafter described, the aging may take place after mixing with the latex.

Where the resin comprises the condensation product of formaldehyde and resorcinol, the molar ratio of formaldehyde to resorcinol may be varied from about 1.4 to 10 without significantly effecting the adhesive properties of the treated cord. After mixing the rubber latex with the phenol and aldehyde, the pH of the mixture may be adjusted with say sodium hydroxide to between 7.5 and 9 and the mixture is permitted to stand until the phenol and aldehyde condense.

In addition to the foregoing, it may be advantageous in certain instances to dip the hot stretched nylon cord in an aqueous solution of the phenol-aldehyde resin and subsequently immersing it in a rubber cement or latex containing from 5 to 30 weight percent of butyl rubber or halogenated butyl rubber. This two-step method is well known in the rubber-treating fabric art.

The rubber used in the dip may or may not be compounded with various other substances such as carbon black and mineral fillers, stabilizers, pigments and curing agents.

The following example is given to illustrate the outstanding advantages obtained by treating nylon cord in accordance with the present invention.

Type T-700 twisted nylon cord of an 840 x 2 denier was woven with 2.5 pick threads per inch and 32.5 ends per inch. The fabric was 58 inches wide on entering the oven and was maintained under a constant tension of 5 lbs./end while it was passed through a Waldron Oven tire cord dipping machine. The latex dip, which contained isobutylene-isoprene butyl rubber having a viscosity average molecular weight of 450,000 and mole percent unsaturation of 1.5, had the following formula:

| Ingredients: | Parts by weight |
|---|---|
| Latex solids [1] | 15 |
| Resorcinol | 2.2 |
| Formaldehyde | 3.5 |
| Water | 79.3 |

[1] Includes rubber, 5 phr. of sodium polyoxyethylene nonyl phenol sulfate and 1 phr. of sodium dihydrogen orthophosphate.

The fabric was immersed in the dip, which was maintained at about 75° F., passed through a squeeze roll and thereafter passed through a hot air oven at the rate of 30 yards/minute. The oven, which was divided into four sections, had the following temperature profile: 430° F., 430° F., 430° F. and no heat. Each portion of the nylon fabric was in the oven 1.75 minutes. While in the oven it was hot stretched so that its final length was 7.9% greater than its original length at the wind up (the gross stretch was 10%). The fabric was very stiff and boardy, and quite difficult to work with.

EXAMPLE

The above procedure was repeated with the same untreated nylon fabric except instead of immersing it in a latex dip the fabric was immersed in water at about 75° F. before passing it through the squeeze rolls and stretching it in the hot air oven. The net stretch at the wind up was 8% and the gross stretch was 11%. The stretched fabric was again passed through the dipping machine, this time, however, the fabric was dipped in a butyl latex-resorcinol formaldehyde resin dip identical with that described above. A tension of 1-2 lbs./cord end was used to maintain the fabric at constant length (0% stretch) as it was immersed in the dip and dried in the oven. In this pass the oven had the following temperature profile: 350° F., 350° F., 350° F. and no heat, all other conditions being the same. The dipped fabric had unusual suppleness and was easy to work with.

Both fabrics, the one which was dipped and hot-stretched in one pass and the other which was hot-stretched before it was dipped were evaluated in the "H" test (described in Rubber Chemistry & Technology 20, page 268; 1947) at 70° F. The carcass stock, which had the following recipe, was imbedded with the fabric and cured at 250° F. for 20 minutes.

Carcass Stock

| Ingredients: | Parts by weight |
|---|---|
| Isobutylene-isoprene butyl rubber | 100 |
| N,4-dinitroso-N-methyl aniline | 0.15 |
| MPC carbon black | 24 |
| SRF carbon black | 16 |
| Amberol ST-137X [1] | 4 |
| Naphthenic hydrocarbon oil [2] | 12.5 |
| Zinc oxide | 5 |
| Phenyl β naphthylamine | 1 |
| Sulfur | 2 |
| Benzothiazyldisulfide | 1.0 |
| Tellurium diethyldithiocarbamate | 1.3 |

[1] Tradename of Rohm & Haas Company for non-reactive resin of p-octyl phenol and formaldehyde.
[2] Extender oil having an API gravity of 25.8° and a flash point of 445° F.

The butyl rubber in the carcass stock had a Mooney viscosity at 212° F. (ML at 8 minutes) of 45 and a mole percent unsaturation of 2.3. The results of the "H" test are given in Table:

TABLE

Effect of Hot-Stretching Nylon Fabric Before and After Dipping

|  | Dipping followed by hot-stretching | Hot-stretching followed by dipping |
|---|---|---|
| "H" test, lbs./end | 5 lbs./end | 9 lbs./end |

The "H" specimens were pulled at 10 inches per minute on a Scott Tester. The data show that not only does the process of the present invention significantly improve the texture of the treated fabric, but it also increases its adhesive properties.

The process of the present invention is applicable not only in a tire cord treating operation but may be used wherever it is necessary for nylon fabric treated with polymer to have a supple quality and good adhesion to rubber. For instance the fabric may be used in motor belts and hoses as well as both automobile and truck tires.

While the example describes the hot-stretching and dipping steps as two separate passes through the same machine, it is of course obvious that the process could be carried out in the proper sequence on a single machine so that it would be a continuous process. Resort may be had to modifications and variations of the present invention without departing from the spirit of the discovery or the scope of the appended claims.

What is claimed is:
1. Process for treating nylon to prepare a supple butyl rubber coated fabric which comprises exposing nylon fabric to an ambient temperature of 400° to 500° F. for 5 to 600 seconds, simultaneously with said exposure stretching the hot fabric about 6 to 10% of its unstretched length under about 2 to 6 lbs./cord end tension, cooling, dipping the stretched fabric under low tension in an aqueous system containing dispersed butyl rubber having a Wijs iodine number of about 1 to 50 and a thermosetting water soluble resin, and drying the fabric while maintaining it at constant length throughout both said dipping and drying steps.

2. Process according to claim 1 in which the butyl rubber contains at least 0.5 weight percent combined halogen.

3. Process for treating nylon to prepare a supple isobutylene-isoprene butyl rubber fabric which comprises passing nylon fabric through an oven which is at a temperature of 400° to 500° F., simultaneously with said passage applying 4 to 5 lbs./cord end of tension to the fabric, stretching the nylon fabric about 6 to 10% of its unstretched length while the fabric is passing through said oven, cooling, dipping the stretched fabric in an aqueous system containing dispersed isobutylene-isoprene butyl rubber having a Wijs iodine number of about 1 to 50, and a phenol-aldehyde resin, and drying the dipped fabric under sufficient tension to maintain it at constant length throughout both said dipping and drying steps.

4. Process according to claim 3 in which the butyl rubber contains at least 0.5 weight percent combined halogen but not more than 3 atoms of combined halogen per double bond in the butyl rubber, and the resin is a resorcinol-formaldehyde resin.

References Cited in the file of this patent

UNITED STATES PATENTS

| 2,754,239 | Robison | July 10, 1956 |
| 2,844,488 | Meherg et al. | July 22, 1958 |
| 2,846,752 | Lessig | Aug. 12, 1958 |
| 2,943,664 | Baldwin et al. | July 5, 1960 |
| 2,955,958 | Brown | Oct. 11, 1960 |

FOREIGN PATENTS

| 616,549 | Great Britain | Jan. 24, 1949 |